United States Patent
Côté

(10) Patent No.: US 10,755,483 B1
(45) Date of Patent: Aug. 25, 2020

(54) TECHNIQUES FOR ACCURATE AND FAITHFUL PROJECTIONS IN AN OUTDOOR AUGMENTED REALITY VIEW

(71) Applicant: Bentley Systems, Incorporated, Exton, PA (US)

(72) Inventor: Stéphane Côté, Lac Beauport (CA)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 16/104,582

(22) Filed: Aug. 17, 2018

(51) Int. Cl.
*G06T 19/00* (2011.01)
*G06T 17/20* (2006.01)
*G06T 19/20* (2011.01)
*G06T 7/73* (2017.01)

(52) U.S. Cl.
CPC ............ *G06T 19/006* (2013.01); *G06T 7/73* (2017.01); *G06T 17/20* (2013.01); *G06T 19/20* (2013.01); *G06T 2207/10028* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| 9,070,216 | B2 | 6/2015 | Golparvar-Fard et al. |
|---|---|---|---|
| 9,715,008 | B1 | 7/2017 | Côté et al. |
| 9,852,238 | B2 | 12/2017 | Forsyth et al. |
| 2012/0127161 | A1* | 5/2012 | Wallbom .............. G06T 17/05 345/419 |
| 2014/0200863 | A1* | 7/2014 | Kamat .................. G01C 15/00 703/1 |
| 2016/0379414 | A1 | 12/2016 | Brown et al. |
| 2017/0292248 | A1* | 10/2017 | Matson .................. E02F 9/261 |
| 2018/0012411 | A1 | 1/2018 | Richey et al. |
| 2018/0251961 | A1* | 9/2018 | France .................. E02F 9/265 |
| 2018/0293801 | A1* | 10/2018 | Metzler .................. G06T 7/74 |

OTHER PUBLICATIONS

Cadena, Cesar, et al., "Past, Present, and Future of Simultaneous Localization and Mapping: Toward the Robust-Perception Age," IEEE, IEEE Transactions on Robotics, vol. 32, No. 6, Dec. 2016, pp. 1309-1332.

(Continued)

*Primary Examiner* — James A Thompson
(74) *Attorney, Agent, or Firm* — Cesari and McKenna, LLP; James A. Blanchette (57) ABSTRACT

In one embodiment, techniques are provided for projecting information (e.g., describing subsurface features such as subsurface utilities) onto a surface (e.g., road surface) of the physical environment using pre-captured topography (e.g., determined by structure-from-motion (SfM) photogrammetry) and pre-projection of the information onto the pre-captured topography. The pre-projected information is subsequently combined with a live view of the physical environment to produce an augmented reality view that is displayed to a user.

20 Claims, 6 Drawing Sheets

(56) References Cited

OTHER PUBLICATIONS

Faltynova, M., et al., "Building Façade Documentation Using Laser Scanning and Photogrammetry and Data Implementation Into BIM," The International Archives of the Photogrammetry, Remote Sensing and Spatial Information Sciences, vol. XLI-B3, 2016 XXIII ISPRS Congress, Prague, Czech Republic, Jul. 12-19, 2016, pp. 215-220.
Lukss, Ints, et al., "Modern Photogrammetry-Capturing Reality for Geoprocessing," MikroKods, BIM and Beyond-Baltic Tour, Vilnius-Riga-Tallinn, Oct. 18-20, 2016, pp. 1-38.
U.S. Appl. No. 15/091,796, filed Apr. 6, 2016 by Stéphane Côté et al. for a Tool for Accurate Onsite Model Visualization That Facilitates Environment Interaction pp. 1-29.
U.S. Appl. No. 15/709,115, filed Sep. 19, 2017 by Stéphane Côté et al. for Tool for Onsite Augmentation of Reality Meshes, pp. 1-27.
Westoby, M.J., et al., "'Structure-from-Motion' photogrammetry: A low-cost, effective tool for geoscience applications," Elsevier B.V., Geomorphology, vol. 179, Sep. 6, 2012, pp. 300-314.

\* cited by examiner

TECHNIQUES FOR ACCURATE AND FAITHFUL PROJECTIONS IN AN OUTDOOR AUGMENTED REALITY VIEW

BACKGROUND

Technical Field

The present disclosure relates to augmented reality, and more specifically to techniques for projecting information (e.g., describing subsurface features such as subsurface utilities such as water pipes, sewer pipes, electrical conduits, etc.) onto a surface (e.g., road surface) in a view of the physical environment.

Background Information

Excavation work (e.g., road excavation work) often creates traffic disruptions that inconvenience local residents and harm the local economy. Further, there is potential of injury should mistakes occur. Accordingly, it is important to carefully plan such work, so that it can be conducted efficiently and safely. Traditionally, excavation work has been planned in the field using paper plans, where a worker looks at the plans and the physical environment (e.g., the road surface), and manually determines subsurface features (e.g., subsurface utilities such as water pipes, sewer pipes, electrical conduits, etc.) are located. More recently, there has been research into using augmented reality for excavation work, to permit a worker to see information (e.g., a computer-generated visualization) describing subsurface features projected upon a surface in an augmented reality view of the physical environment. By projecting information upon the surface, the worker may be freed from using paper plans.

In a typical adaptation of augmented reality technology to excavation work, a worker may hold or wear an augmented reality device, such as a head-mounted display unit (e.g., a Microsoft HoloLens® head-mounted display unit), tablet computer (e.g., a Google Tango® tablet computer), smartphone, etc. An augmented reality application executing on the device uses a camera to capture a stream of images of the physical environment. A pose determination system (e.g., a number of position and orientation sensors and supporting software) determines the pose of the camera. Based on the pose, the application aligns information that describes subsurface features (e.g., a 3-D model, a 2-D map or drawing, etc.) with the images of the physical environment, and augments the images of the physical environment based thereon. The augmentations may take the form of projections upon a surface (e.g., the road surface) following the topography of the surface. In some cases, the projections appear as virtual paint markings that follow the topography of the surface as if real paint had been sprayed directly thereon.

In order for the projections to well follow the surface (e.g., the road surface), the topography of the surface needs to be determined. However determining accurate topography has proven challenging, especially in outdoor environments. Existing augmented reality devices generally attempt to determine topography in real-time. Some augmented reality devices, such as the Microsoft HoloLens® head-mounted display unit and the Google Tango® tablet computer, attempt to determine topography in real-time based on a combination of Simultaneous Localization and Mapping (SLAM)-determined position and data from a range sensor. Software on the augmented reality device calculates a position of the device by applying a SLAM algorithm to a live video stream from a camera of the device. By combining the determined position of the device with range to a portion of a surface provided by a range sensor, software attempts to determine topography of the surface. However, topography data calculated in this manner is often inaccurate for outdoor environments. The range sensors on many augmented reality devices often have low resolution and very limited range (e.g., less than 5 meters). Further, such range sensors often rely upon infrared light, and can be interfered with by directed sunlight. Accordingly, while useful in indoor environments with generally flat surfaces, they are typically poorly suited for use in outdoor environments with irregular surfaces, and fail to yield accurate topography data in such settings.

Other augmented reality devices, including many smartphones, attempt to determine topography in real-time based only on SLAM, using the algorithm to determine both position of the device and topography, by creating meshes from visual features. While position determined in this manner may be fairly accurate, the meshes are generally optimized for real-time capture and are typically based on features that are easy to see and track. Consequently they are typically very sparse and extend only a short range from the device (e.g., a few tens of meters). As a result, topography data determined therefrom typically lacks detail and is inaccurate, making it poorly suited for projections. Further, to cover a large outdoor environment given the short range, the user may be required to traverse long distances to ensure there are no gaps for which topography data is lacking, which can be inconvenient.

Still other augmented reality devices rely upon portable laser scanners that attempt to determine topography in real-time by producing a live point cloud. Such devices may be capable of very accurately determining the position of the device and the topography of a surface in a limited area around the device (e.g., a few tens of meters limited by the grazing capture angle from the portable laser scanner). However, portable laser scanners are generally very expensive. Further, similar to SLAM-based devices, the limas ited range of portable laser scanners may require users to traverse long distances to fully cover a large outdoor environment, which can be inconvenient. Finally, the need to process the point cloud may impose significant processing and memory demands upon the augmented reality device, slowing the response of the device and impairing the user experience.

What is needed is techniques for enabling projections of information onto a surface in an augmented reality view of the physical environment that avoid some or all of the shortcomings of real-time topography determination. It would be desirable if such techniques could address some of the problems particular to large outdoor environments, which have hindered the use of augmented reality in such spaces. It would further be desirable if such techniques could reduce processing and memory demands on augmented reality devices compared to some prior techniques.

SUMMARY

Techniques are provided for projecting information (e.g., describing subsurface features) onto a surface (e.g., road surface) in a view of the physical environment using pre-captured topography (e.g., determined by structure-from-motion (SfM) photogrammetry) and pre-projection of the information onto the pre-captured topography. The pre-projected information may subsequently be combined with a live view of the physical environment to produce an augmented reality view. Pre-capture and pre-projection may enable augmentations to accurately follow a surface even in large outdoor environments, while reducing processing and memory demands in comparison to techniques that utilize real-time topography determination and projection.

In one embodiment, topography of the surface is pre-captured by capturing images of the physical environment that include the surface (e.g., road surface) with a camera. The images are transferred to an electronic device (e.g., computer) executing a structurefrom-motion (SfM) photogrammetry application. The SfM photogrammetry application is uses the captured images to generate a three dimensional (3D) reality mesh (i.e. a 3D polygon mesh based on data captured from the real world) that indicates topography of the surface). The 3D reality mesh is loaded in a 3D design application executing on the electronic device, or another electronic device, along with a 3D model or 2D drawing. The 3D design application pre-projects information (e.g., describing subsurface features) onto the pre-captured topography. To do this, the 3D design application scales the 3D reality mesh to a same scale as the 3D model or 2D drawing, aligns the 3D reality mesh with a 3D model or 2D drawing, and then projects (e.g., vertical projects) information based on the 3D model or 2D drawing onto the topography indicated in the 3D reality mesh. The pre-projected information and the 3D reality mesh are maintained with a same georeference and pre-loaded onto an augmented reality device. Subsequently, the augmented reality device may generate an augmented reality view on-site by capturing a live view of the physical environment, aligning the 3D reality mesh and pre-projected information with the live view (e.g., manually or automatically establishing points of correspondence between features or by other techniques), and combining the live view with the pre-projected information (with the 3D reality mesh itself hidden) to produce a result that is displayed.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings of example embodiments, of which.

DETAILED DESCRIPTION

Figure 1:
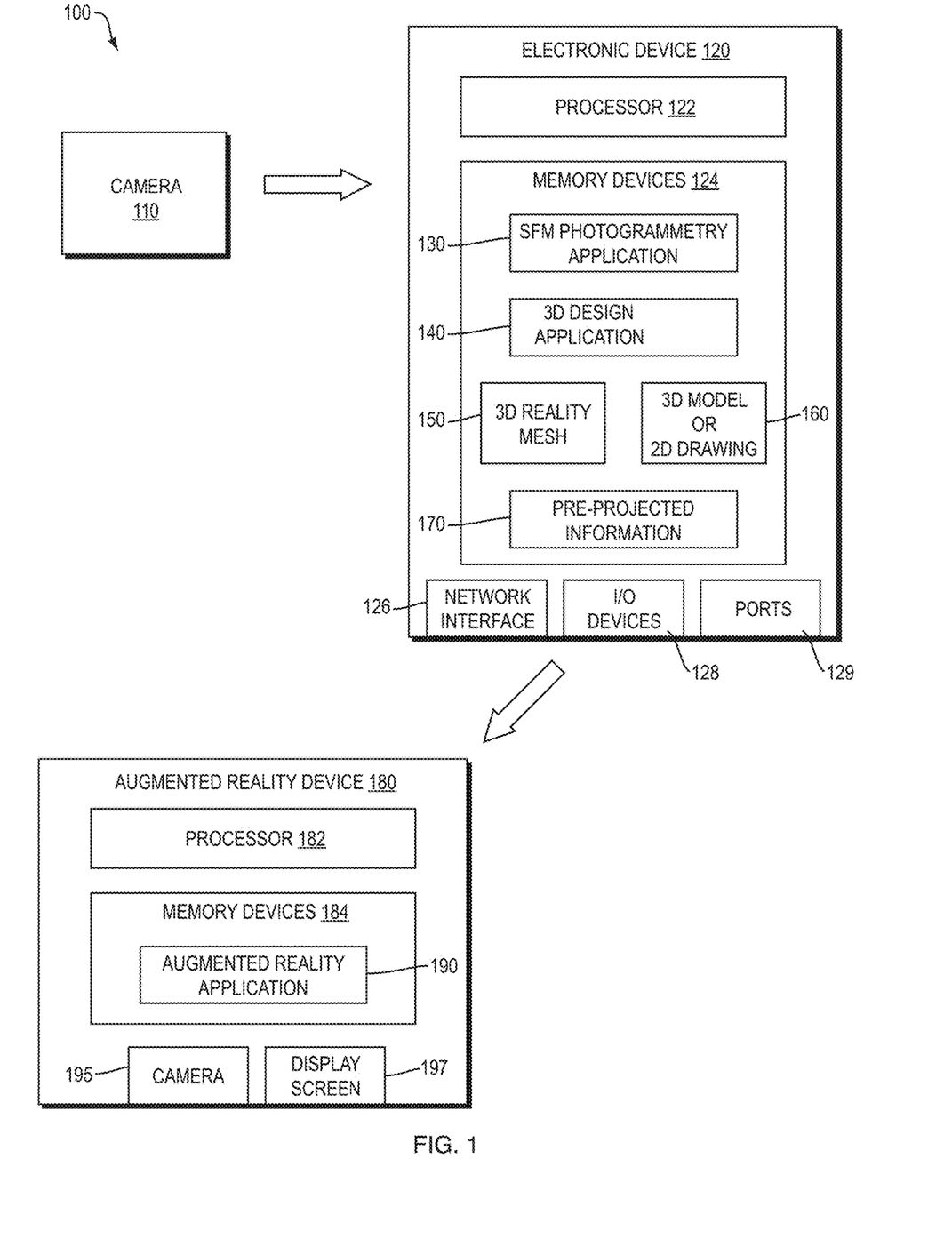
FIG. 1 is a diagram of an example system for delivering augmented reality including projections based on a pre-captured topography and pre-projection of the information onto the pre-captured topography.

FIG. 1 is a diagram of an example system 100 for delivering augmented reality including projections based on a pre-captured topography and pre-projection of the information onto the pre-captured topography. The system includes a camera 110 used to capture a set of images of the physical environment that include a surface (e.g., road surface) for which augmentation is desired. The camera may be a stand-alone digital camera (still or video), part of a mobile device (e.g., a smartphone), or part of another other type of handheld electronic device. Alternative, the camera may be part of a separate device, for example a user-operated vehicle or drone or an autonomously-operated vehicle or drone.

The system also includes an electronic device 120 (e.g., computer). The electronic device may include a variety of hardware and software components. For example, the electronic device 120 may include a processor 122 coupled to volatile and non-volatile memory devices 124 for storing software, such as a SfM photogrammetry application 130 and a 3D design application 140, and data such as a 3D reality mesh 150, a 3D model or 2D drawing 160, and a set of pre-projected information 170. The SfM photogrammetry application 130 may be any of a number of photogrammetric analysis and model generation applications that utilize camera movement to determine structure. In one implementation, the SfM photogrammetry application may be the Context Capture™ application available from Bentley Systems, Inc. The 3D design application 140 may be any of a number of computer aided design (CAD) software platforms. In one implementation, the 3D design application 140 may be Microstation® modeling, documentation, and visualization software available from Bentley Systems, Inc. The electronic device 120 may further include a network interface 126, input/output (I/O) devices 128 (e.g., a keyboard, a mouse, a display screen, etc.), as well as a variety of ports 129. In operation, the images captured by the camera 110 may be transferred to the electronic devices 120 via a computer network (not shown) coupled to the network interface 126, via a removable storage media (e.g., a flash drive) interacting with the ports 129, or other data transfer technique. The I/O devices 128 may be used for user interaction with the SfM photogrammetry application 130 and 3D design application 140.

The system further includes an augmented reality device 180 having a processor 182 and memory devices 184 configured to store an augmented reality application 190 that is executed on the processor. The augmented reality device 180 may be a head-mounted display unit (such as the Microsoft HoloLens® head-mounted display unit), a tablet computer, or another type of mobile device, and typically includes a camera (e.g., a video camera) 195 and a display screen 197. In operation, the 3D reality mesh 150 and pre-projected information 170 from the electronic device 120 may be transferred to the augmented reality device 180 via a computer network (not shown), via a removable storage media or other data transfer technique, where it is combined with the live view captured by the camera 195 to produce an augmented reality view that is displayed on the display screen 197.

Figure 2:
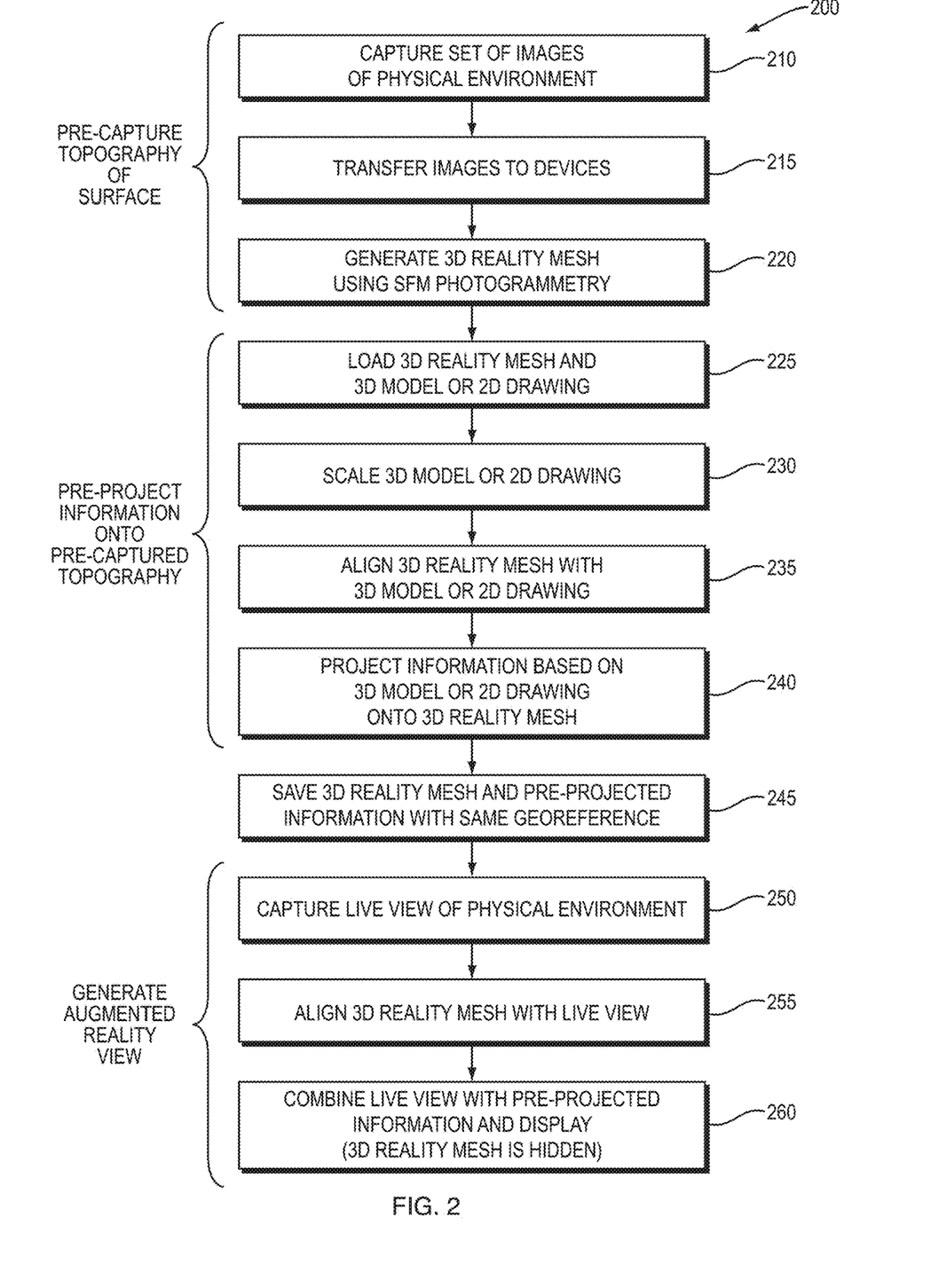
FIG. 2 is a flow diagram of an example sequence of steps for projecting information onto a surface using pre-captured topography and pre-projection of the information onto the pre-captured topography.

FIG. 2 is a flow diagram of an example sequence of steps 200 for projecting information onto a surface in a view of the physical environment using pre-captured topography and pre-projection of the information onto the pre-captured topography. First, at a time prior to display of an augmented reality view, the topography of a surface in the physical environment is pre-captured. To such end, at step 210, a set of images of the physical environment that include the surface are captured with the camera 110. Such images are preferably captured from a large number of different locations and orientations, such that there is sufficient motion among the images to enable SfM photogrammetry, and preferably include full coverage of the surface, such that there are not substantial "gaps" in the areas seen. At step 215, the set of images are transferred to the electronic device 120. At step 220, the SfM photogrammetry application 130 on the electronic device 120 generates a 3D reality mesh 150 using the images of the set. Details of how this may be performed are discussed below in reference to FIG. 6.

Figure 3:
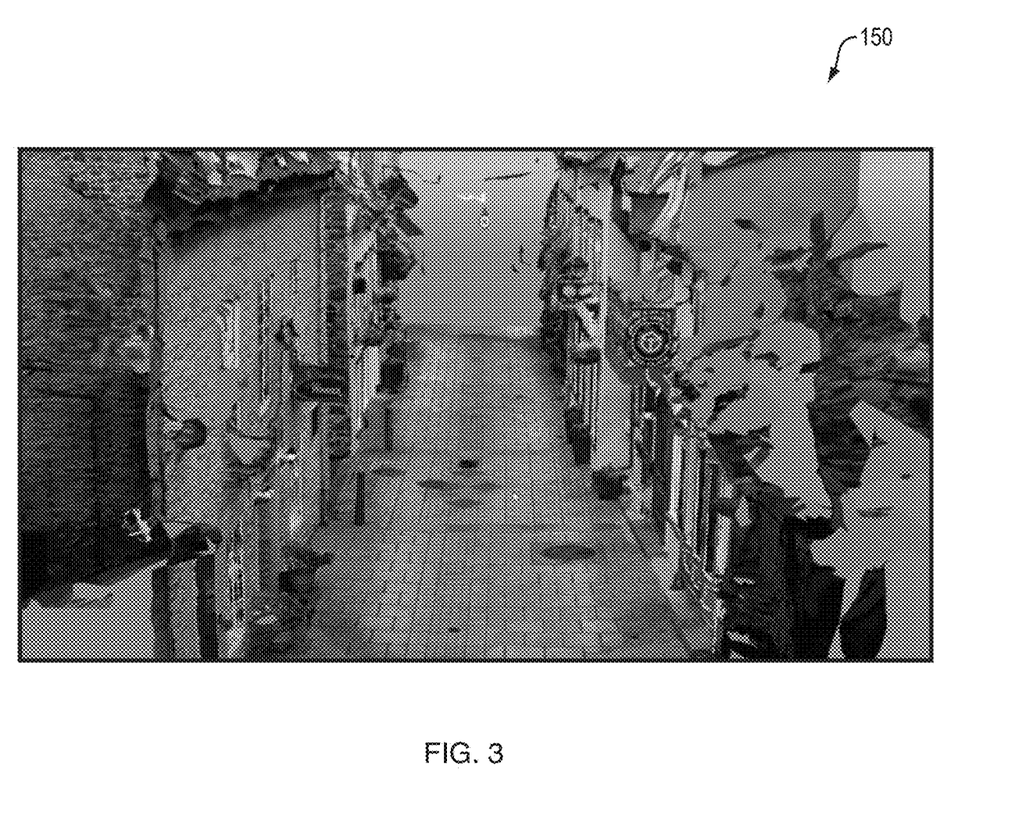
FIG. 3 is an example 3D reality mesh that may be generated as part of FIG. 2 by a SfM photogrammetry application.

FIG. 3 is an example 3D reality mesh 150 that may be generated as part of step 220 of FIG. 2 by the SfM photogrammetry application 130. The 3D reality mesh 150 represents a city street and the facades of buildings located on the street. The portions of the buildings that were not visible in the set of images (e.g., the roofs, back walls, etc.) appear as open areas in the mesh. It should be understood, however, that a city street and facades of buildings are but one example of the types of surfaces and physical environments that may be embodied in a 3D reality mesh 150.

Thereafter, information based on a 3D model or 2D drawing 160 is pre-projected onto the pre-captured topography indicated in the 3D reality mesh 150. To that end, at step 225, the 3D design application 140 on the electronic device 120 loads both the 3D reality mesh 150 and the 3D model or 2D drawing 160. The 3D model or 2D drawing 160 may include, or reference separately stored, information to be projected. At step 230, the 3D design application 140 scales the 3D reality mesh 150 to a same scale as the 3D model or 2D drawing 160. At step 235, the 3D design application 140 aligns the 3D reality mesh 150 with a 3D model or 2D drawing 160. Thereafter, at step 240, the 3D design application 140 projects information based on the 3D model or 2D drawing 160 onto the 3D reality mesh 150, generating a set of pre-projected information 170.

Figure 4:
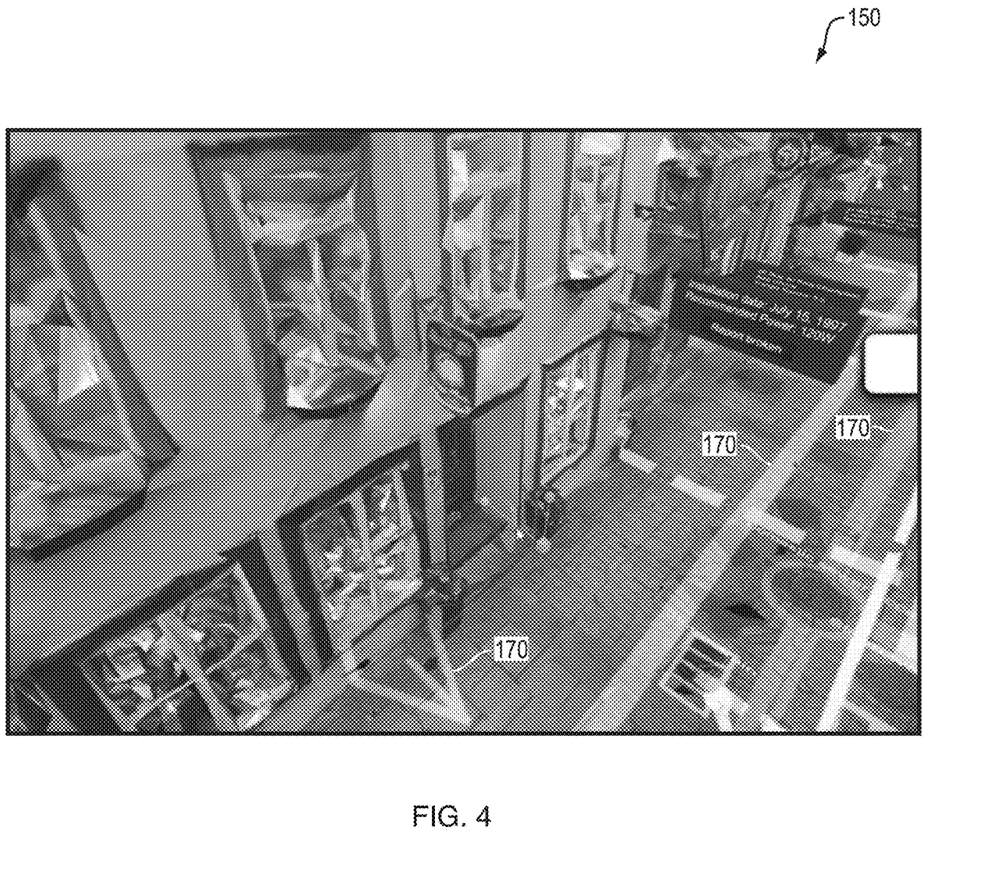
FIG. 4 is an example of pre-projected information upon a 3D reality mesh that may be generated as part of FIG. 2 by a 3D design application.

FIG. 4 is an example of pre-projected information 170 upon a 3D reality mesh 150 that may be generated as part of step 240 of FIG. 2 by the 3D design application 140. In this example, the projections are from a 3D model that describes subsurface utilities such as water pipes, sewer pipes, etc., the surface is a road surface, and the projection is a vertical projection up onto the road surface. It should be understood, however, that other types of information may be described by the 3D model or 2D drawing 160, which may be projected on to other surfaces, yielding a projection of different information, onto a different surface, in a different direction.

At step 245, the 3D reality mesh 150 and pre-projected information 170 are saved with a same georeference in a format that can be displayed individually. As part of step 245, the 3D reality mesh 150 and pre-projected information 170 may be pre-loaded onto the augmented reality device 180 from the electronic device 120.

At a subsequent time, the augmented reality application 190 on the augmented reality device 180 generates an augmented reality view using the 3D reality mesh 150 and pre-projected information 170. To that end, at step 250 the camera of the augmented reality device 180 captures a live view of the physical environment. At step 255, the augmented reality application 190 aligns the 3D reality mesh 150, and pre-projected information 170 which shares the same georeference, with the live view, using the 3D reality mesh 150 as a guide. Such alignment may be performed in a number of different manners depending upon the implementation.

In some implementations, alignment may be performed by manually establishing points of correspondence between features in the 3D reality mesh 150 and the live view. The augmented reality application 190 may display the 3D reality mesh 150 on the display screen 197 of the augmented reality device 180 together with the live view (e.g., as a transparent overlay, side-by-side, or in another manner). The 3D reality mesh 150 may be shown at an approximately correct pose based on automatically determined data (e.g., GPS data, data from an orientation sensor, etc.). The user may be prompted to select points of correspondence in the 3D reality mesh 150 and the live view. Because of the 3D reality mesh 150 is shown at an approximately correct pose, the points of correspondence may already be relatively close to each other. Selection of three points is typically sufficient to enable alignment.

In other implementations, alignment may be performed by the augmented reality application 190 without user action using an automatic algorithm. Any of a number of known algorithms may compare the 3D reality mesh 150 with the live view and attempt to find points of correspondence automatically.

After alignment, at step 260, the augmented reality application 190 produces an augmented reality view by combining the live view with the pre-projected information 170 and displaying it on the display screen 197. The 3D reality mesh 150 may be hidden in the augmented reality view (e.g., "turned off").

Figure 5:
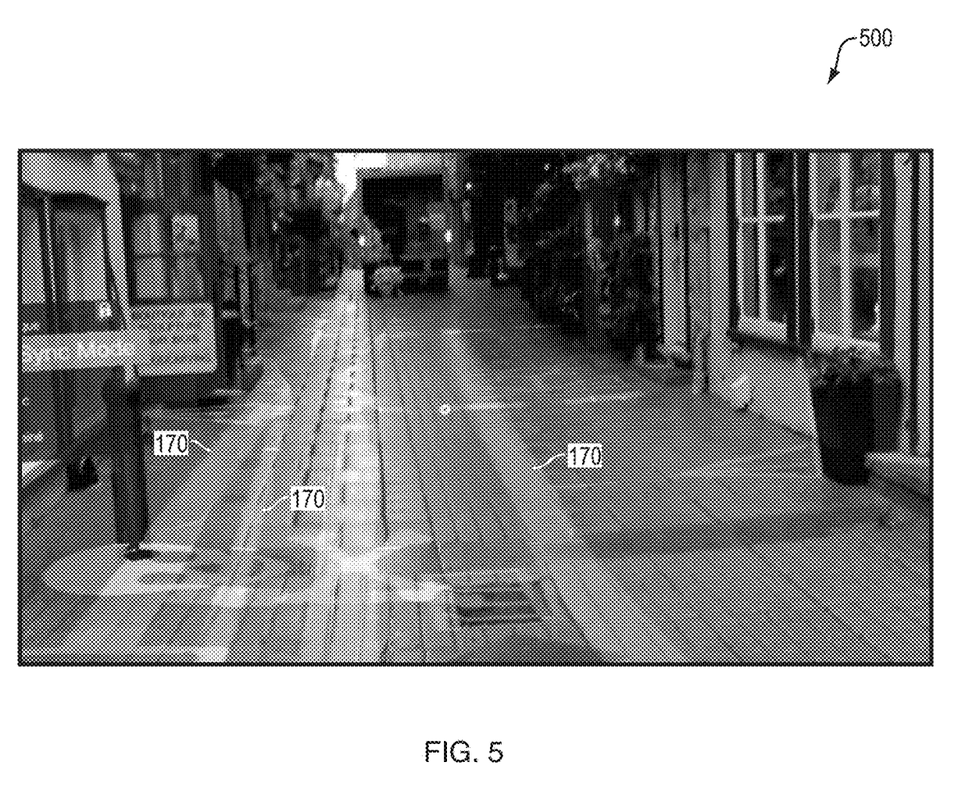
FIG. 5 is an example augmented reality view generated from pre-projected information that may be displayed on a display screen of an augmented reality device.

FIG. 5 is an example augmented reality view 500 generated from pre-projected information that may be displayed on a display screen 197 of an augmented reality device 180. In this example, the pre-projected information is subsurface utilities such as water pipes, sewer pipes, electrical conduits, etc. It should be understood, however, that other types of pre-projected information may be combined and displayed in the augmented reality view. As can be seen, the pre-projected information is displayed at the corrected positions and orientations in the physical environment, following topography of the roadway.

Figure 6:
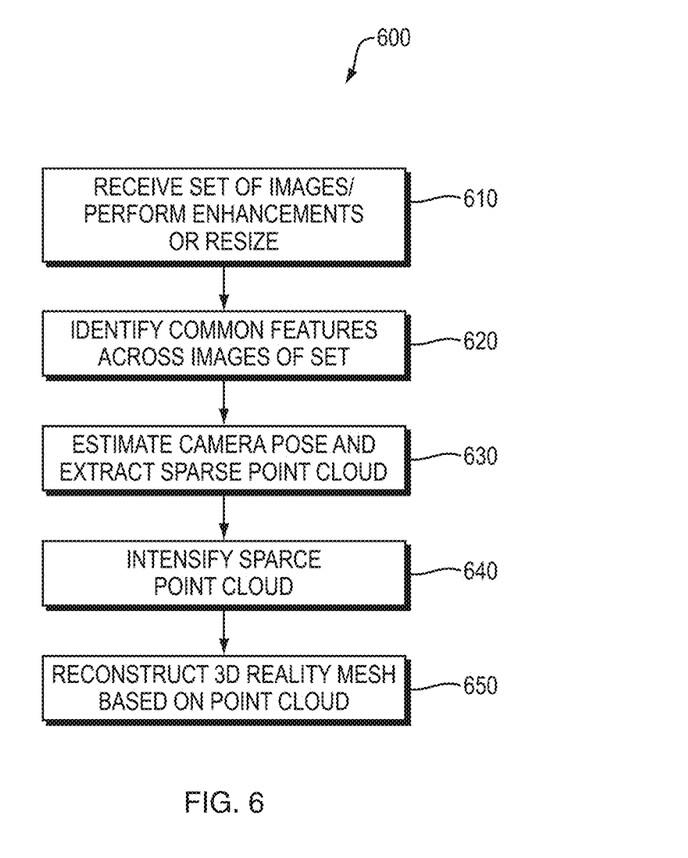
FIG. 6 is a flow diagram an example sequence of steps which may be performed by a SfM photogrammetry application as part of FIG. 2 to generate a 3D reality mesh from a set of images.

FIG. 6 is a flow diagram an example sequence of steps which may be performed by the SfM photogrammetry application as part of step 220 of FIG. 2 to generate a 3D reality mesh from a set of images. At step 610, the SfM photogrammetry application receives the set of images and performs any necessary enhancements or resizing thereto to improve image quality, to reduce processing times to acceptable durations, or achieve other objectives. At step 620, the SfM photogrammetry application identifies common features in individual images across the set of images sufficient to establish spatial relationships. One algorithm that may be used to identify common features is a scale invariant feature transform (SIFT) algorithm that identifies keypoints in images that are invariant to image scaling and rotation and at least partially invariant to changes in illumination conditions and camera viewpoints. The SIFT algorithm may assign descriptors computed by transforming local image gradients into a representation that is largely insensitive to variations in illumination and orientation.

At step 630, the SfM photogrammetry application estimates camera pose for images of the set of images and extracts a low-density or "sparse" point cloud. One algorithm that may be used to extract the sparse point cloud is a sparse bundle adjustment algorithm. The sparse bundle adjustment algorithm may match keypoints in multiple images and produce "tracks" linking specific keypoints. Correspondences between keypoints place constraints on camera poses. With camera poses determined, triangulation can then be used to estimate 3-D point positions and incrementally reconstruct geometry.

At step 640, the SfM photogrammetry application intensifies the sparse point cloud to produce a high-density point cloud. Such intensification may involve multi-view stereo (MVS) techniques. Such MVS techniques may enable generation of a very high resolution dataset, whilst isolating and removing gross errors.

Then, at step 650, the SfM photogrammetry application reconstructs a 3D reality mesh from the high-density point cloud and returns a 3D reality mesh. Various algorithms may be used in performing the reconstruction, such as a Poisson surface reconstruction algorithm or 3D Delaunay triangulation algorithm. In some cases, the 3D reality mesh may be a multi-resolution 3D reality mesh that includes a number of different resolutions or levels of detail (LODs).

In conclusion, the above description discusses example techniques for projecting information onto a surface in a view of the physical environment using pre-captured topography and pre-projection of the information onto the pre-captured topography. It should be understood that a number of modifications and/or additions may be made without departing from the disclosure's intended spirit and scope. While it is described above that the surface may be a road surface and the information may describe subsurface features such as subsurface utilities, it should be understood that the surface may be other types of surfaces, such as other type of substantially horizontal surfaces (e.g., sidewalk surfaces, lawn surfaces, ceiling surfaces, etc.), substantially vertical surfaces (e.g., wall surfaces), or combinations thereof (e.g., stairway surfaces having both horizontal and vertical components). Further, it should be understood that the information may describe other types of hidden features, including features that exist in the physical environment that are otherwise obscured (e.g., behind the surface, above the surface, etc.), features that do not exist in the physical environment (e.g., features to be constructed in the future, features that are part of a simulation or game, etc.), features that provide context information (e.g., address or ownership indications, qualitative ranking, status information, etc.), as well as other types of useful data. Such information may be included in the 3D model or 2D drawing 160 itself, or separately stored and related to specific locations in the 3D model or 2D drawing 160, and when those locations are projected onto a surface, accessed and related to that portion of the surface.

Further, while it is described above that the SfM photogrammetry application 130 and 3D design application 140 are both executed on the same electronic device 120, and the data they use is likewise stored on such device, it should be understood that a variety of distributed, remote and cloud-based computing arrangements are also possible, the applications may be executed on and/or the data stored upon multiple different electronic devices.

Finally, it should be understood that many of the above discussed techniques may be implemented in software, in hardware, or in a combination thereof. A software implementation may include electronic device-executable instructions stored in a non-transitory electronic device-readable medium, such as a volatile or persistent memory, a hard-disk, a compact disk (CD), or other storage medium. A hardware implementation may include specially configured processors, application specific integrated circuits (ASICs), and/or other types of hardware components. Further, a combined software/hardware implementation may include both electronic device-executable instructions stored in a non-transitory electronic device-readable medium, as well as one or more specially configured hardware components. Above all, it should be understood that the above descriptions are meant to be taken only by way of example.

What is claimed is:

1. A method for projecting information onto a surface in an augmented reality view of a physical environment, comprising:
   pre-capturing topography of the surface by
      capturing images of the physical environment that include the surface with a camera,
      generating a three dimensional (3D) reality mesh using the camera-captured images, the 3D reality mesh being a 3D polygon mesh representation of the surface generated using the camera-captured images that indicates topography of the surface;
   pre-projecting information onto the pre-captured topography by
      aligning the 3D reality mesh with a 3D model or 2D drawing,
      projecting information based on the 3D model or 2D drawing onto the topography indicated in the 3D reality mesh; and
   subsequent to the pre-capturing and pre-projecting, generating an augmented reality view on an augmented reality device by
      capturing a live view of the physical environment,
      aligning the 3D reality mesh and pre-projected information with the live view, and
      combining the live view with the pre-projected information to produce the augmented reality view that is displayed on the augmented reality device.

2. The method of claim 1, wherein the generating uses structure-from-motion (SfM) photogrammetry.

3. The method of claim 1, wherein surface is a road surface and the pre-projected information represents subsurface features.

4. The method of claim 3, wherein the subsurface features comprise subsurface utilities.

5. The method of claim 1, wherein the pre-projecting further includes:
   scaling the 3D reality mesh to a same scale as the 3D model or 2D drawing.

6. The method of claim 1, wherein the pre-projecting further comprises:
   maintaining the pre-projected information and the 3D reality mesh with a same georeference.

7. The method of claim 1, wherein the generating the 3D reality mesh, the aligning the 3D reality mesh with the 3D model or 2D drawing and the projecting information are performed on one or more electronic devices separate from the augmented reality device, and the method further comprises pre-loading the 3D reality mesh and the pre-projected information on the augmented reality device.

8. The method of claim 1, wherein aligning the 3D reality mesh with the live view further comprises:
   manually or automatically establishing points of correspondence between features in the 3D reality mesh and corresponding features in the live view of the physical environment.

9. The method of claim 1, wherein the 3D reality mesh is not displayed in the augmented reality view.

10. A method for projecting information onto a surface in an augmented reality view of a physical environment, comprising:
pre-capturing topography of the surface by generating a three dimensional (3D) reality mesh that indicates topography of the surface, the 3D reality mesh being a 3D polygon mesh representation of the surface generated using camera-captured images;
pre-projecting information onto the pre-captured topography;
subsequent to the pre-capturing and pre-projecting, generating an augmented reality view on an augmented reality device by
capturing a live view of the physical environment,
aligning the 3D reality mesh and pre-projected information with the live view, and
combining the live view with the pre-projected information to produce the augmented reality view that is displayed on the augmented reality device.

11. The method of claim 10, wherein the pre-capturing further comprises:
generating the 3D reality mesh using the camera-captured images using structure-from-motion (SfM) photogrammetry.

12. The method of claim 10, wherein the pre-projecting further comprises:
aligning the 3D reality mesh with a 3D model or 2D drawing; and
projecting information based on the 3D model or 2D drawing onto the topography indicated in the 3D reality mesh.

13. The method of claim 10, wherein the surface is a road surface and the pre-projected information represents subsurface features.

14. The method of claim 13, wherein the subsurface features comprise subsurface utilities.

15. The method of claim 10, wherein the pre-capturing topography and pre-projecting information are performed on one or more electronic devices separate from the augmented reality device, and the method further comprises pre-loading the 3D reality mesh and the pre-projected information on the augmented reality device.

16. The method of claim 10, wherein aligning the 3D reality mesh with the live view further comprises:
manually or automatically establishing points of correspondence between features in the 3D reality mesh and corresponding features in the live view of the physical environment.

17. The method of claim 10, wherein the 3D reality mesh is not displayed in the augmented reality view.

18. A non-transitory electronic device readable medium having instructions stored thereon, the instructions when executed by one or more electronic devices operable to:
generate a three-dimensional (3D) reality mesh by applying structure-from-motion (SfM) photogrammetry to camera-captured images of the physical environment that include a surface, the 3D reality mesh being a 3D polygon mesh representation of the surface generated using the camera-captured images that indicates topography of the surface;
align the 3D reality mesh with a 3D model or 2D drawing;
project information based on the 3D model or 2D drawing onto the topography indicated in the 3D reality mesh;
align the 3D reality mesh and pre-projected information with a live view of the physical environment; and
combine the live view with the pre-projected information to produce an augmented reality view that is displayed.

19. The non-transitory electronic device readable medium of claim 18, wherein the surface is a road surface and the pre-projected information represents subsurface features.

20. The non-transitory electronic device readable medium of claim 18, wherein the instructions when executed by the one or more electronic devices are further operable to:
maintain the projected information and the 3D reality mesh with a same georeference.

* * * * *